June 20, 1944.　　　G. L. DIMMICK　　　2,352,085
REDUCTION IN REFLECTION FROM GLASS
Filed Aug. 29, 1941
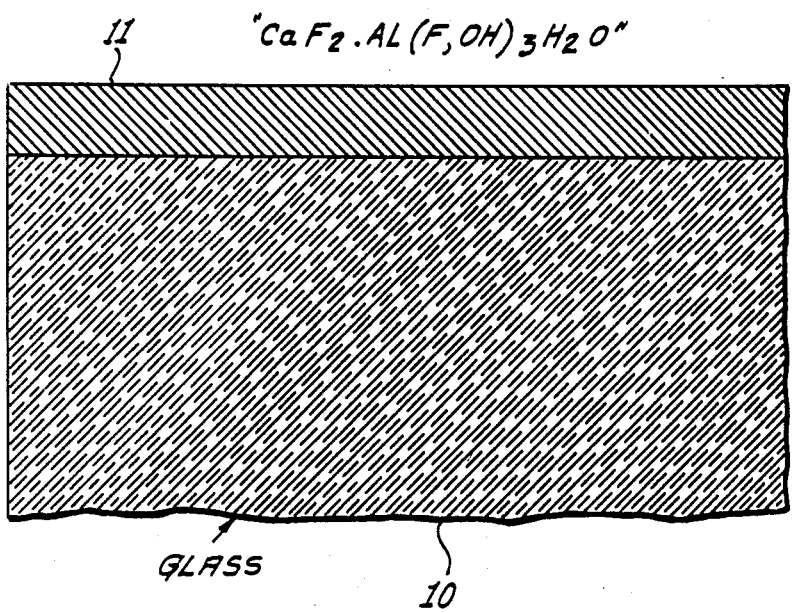
Inventor
GLENN L. DIMMICK
Attorney Patented June 20, 1944

2,352,085

UNITED STATES PATENT OFFICE 2,352,085

REDUCTION IN REFLECTION FROM GLASS

Glenn L. Dimmick, Indianapolis, Ind., assignor to Radio Corporation of America, a corporation of Delaware Application August 29, 1941, Serial No. 408,807

6 Claims. (Cl. 88—1)

This invention relates to a reflection reducing coating for the surface of glass or similar materials.

It has been known for some time that if an optical medium, such as glass was coated with transparent material having a thickness of an odd number of quarter wave lengths of light and an index of refraction approaching the square root of that of the optical medium the surface reflection for light of the wave length from which the thickness of the coating was computed would be reduced to a minimum.

Various materials have been proposed for such coatings including, for example, the fatty acid salts of the alkali earths and the fluorides of some of the alkali earths. In my application Serial No. 348,815, filed July 31, 1940, I disclosed the fact that a mixture of calcium fluoride and aluminum oxide produced a coating approaching the optical properties of calcium fluoride but having far more desirable mechanical properties in that the coating was more adherent and more resistant to abrasion than those theretofore known.

The present invention pertains to an improved coating which is both optically and mechanically superior to that of my earlier application in that the material more nearly approaches the required optical conditions, is extremely hard and tenacious, and provides a very slippery surface which tends to reduce the probability of mechanical damage.

These ends are accomplished by the use of an hydroxyfluoride of calcium and aluminum which may be found naturally as the mineral gearksutite.

One object of the invention is to provide an improved reflection reducing coating for optical elements.

Another object of the invention is to provide an improved coating for glass which will adhere thereto with greater tenacity than the coatings heretofore known.

Another object of the invention is to provide reflection reducing coating for optical media which is permanent and not readily damaged.

Other and incidental objects of the invention will be apparent to those skilled in the art from a reading of the following specification and an inspection of the accompanying drawing in which:

The single figure of drawings represents a reflection reducing coating according to the present invention as applied on the surface of a piece of glass.

The mineral gearksutite has the formula $$CaF_2.Al(F,OH)_3H_2O$$

and occurs naturally in Greenland and in Colorado. The index of refraction of the material along the several crystal axes is between 1.45 and 1.46 and the index of refraction of the evaporated material is approximately 1.3.

When a quarter wave length film of this material is evaporated on glass of index 1.517 the reflected light is reduced to approximately twenty percent of its original value. This evaporation is accomplished in the usual manner by heating the material packed in a coiled filament in appropriate relation to the surface to be coated in an evacuated chamber. In the drawing the glass is represented at 10 and the layer of gearksutite evaporated on the glass is represented at 11.

The film is then aged by baking it for several hours at about 90° C., when it is extremely hard and insoluble in water. The solubility of the film in nitric acid, hydrochloric acid or sulphuric acid is extremely low.

The surface friction of this evaporated film is extremely low which is a distinct advantage as it makes it more difficult to scratch the film when wiping the surfaces. Another advantage of the particular material is that it acts as its own "getter" during the process of evaporation. In the evaporation of the prior materials, such as calcium fluoride or the mixture of calcium fluoride and aluminum oxide above referred to, it is necessary to obtain a vacuum of about 0.2 micron mercury column in order to evaporate a hard uniform film. In the evaporation of gearksutite the evaporation may be started at a pressure of approximately 0.6 microns and the pressure then immediately falls to approximately two-tenths of a micron as soon as the gearksutite begins to boil. The cause of this action is not known but it results in cutting the evaporating time in less than half, as in the ordinary procedure using a large oil molecular pump with an oil fore pump it requires from 10 to 15 minutes to accomplish this same pressure reduction. Gearksutite is described in more detail in Bulletin No. 20 of the U. S. Geological Survey on "Mineralogy of the Rocky Mountains."

I claim as my invention:

1. An optical element having a refracting surface and a reflection reducing coating thereon having a thickness of approximately one quarter wavelength of the light for which maximum reflection reduction is to be produced and consisting of evaporated and deposited gearksutite.

2. An optical element having a refracting surface and a reflection reducing coating thereon having a thickness of approximately an odd number of quarter wavelengths of the light for which maximum reflection reduction is to be produced and consisting of evaporated and deposited gearksutite.

3. An optical element having a refracting surface and a reflection reducing coating thereon having a thickness of approximately one quarter wave length of the light for which maximum reflection reduction is to be produced and consisting of evaporated and deposited hydroxyfluoride of calcium and aluminum.

4. An optical element having a refracting surface and a reflection reducing coating thereon having a thickness of approximately an odd number of quarter wavelengths of the light for which maximum reflection reduction is to be produced and consisting of evaporated and deposited hydroxyfluoride of calcium and aluminum.

5. An optical element having a refracting surface and a reflection reducing coating thereon having a thickness of approximately one quarter wavelength of the light for which maximum reflection reduction is to be produced and consisting of evaporated and deposited $$CaF_2 \cdot Al(F,OH)_3 H_2O.$$

6. An optical element having a refracting surface and a reflection reducing coating thereon having a thickness of approximately an odd number of quarter wavelengths of the light for which maximum reflection reduction is to be produced and consisting of evaporated and deposited $CaF_2 \cdot Al(F,OH)_3 H_2O$.

GLENN L. DIMMICK.